3,219,631
COPOLYMERS OF CYCLIC ACETALS WITH OXA-
CYCLOPROPANE OR OXACYCLOBUTANE OR
THE DERIVATIVES THEREOF AND PROCESS
FOR PREPARING SAID COPOLYMERS
Klaus Küllmar, Frankfurt am Main, Klemens Gutweiler, Mainz (Rhine), and Klaus Weissermel, Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 15, 1961, Ser. No. 152,666
Claims priority, application Germany, Nov. 15, 1960, F 32,549
8 Claims. (Cl. 260—67)

The present invention relates to copolymers of high molecular weight, which can be processed in the thermoplastic state, of cyclic acetals with oxacyclopropane or oxacyclobutane or the derivatives thereof, and to a process for preparing said copolymers.

It is known to polymerize cyclic acetals in the presence of cationically active catalysts and in the presence or absence of inert organic solvents to yield high molecular weight polyacetals that can be processed in the thermoplastic state.

It has already been proposed to copolymerize different cyclic acetals with one another in the presence of cationically active catalysts. In this process, especially when copolymerizing trioxane with diethylene glycol formal, thermoplastic copolymers are obtained which are characterized by an improved thermostability as compared with homopolymers of trioxane.

Still further the copolymerization of trioxane with tetrahydrofurane has been investigated. Copolymers could not be obtained in the presence of boron trifluoride but, after having been heated for 15 hours at 100 to 110° C. in a bomb tube in the presence of antimony trifluoride, trioxane and tetrahydrofurane yielded polymer which was considered to be a true copolymer, although a proof could not be established. The same work reports that copolymers of trioxane and cyclic ethers with 3 or 4 ring members could not be obtained.

It has now been found that copolymers of trioxane and at least one cyclic ether with 3 or 4 ring members can be produced in the presence of cationically active catalysts. Suitable cyclic ethers are, for example, compounds of the general formulae

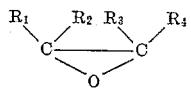

and

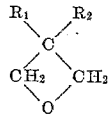

in which the radicals $R_1$, $R_2$, $R_3$ and $R_4$ stand for hydrogen, an alkyl group having 1 to 8 carbon atoms in a straight or branched chain, for example the methyl, isopropyl or octyl group; a cycloalkyl group, for example a cyclopentyl or a cyclohexyl group, which cycloalkyl group may be substituted, for example, by alkyl groups having 1 to 4 carbon atoms in a straight or branched chain, or halogen atoms, preferably chlorine atoms; an aralkyl group, for example the benzyl group or the α-naphthylmethyl group or the β-naphthylmethyl group; or a halogen-substituted alkyl group having 1 to 8 carbon atoms in a straight or branched chain, preferably the chloromethyl group. The radicals $R_1$, $R_2$, $R_3$ and $R_4$ may be identical or different.

The special advantage of the copolymers of the invention is their considerably improved thermostability as compared with homopolymers of trioxane. Homopolymers of trioxane must be stabilized by acetylizing or alkylating the terminal groups before they can be processed by the usual methods.

The copolymers of the invention are so stable that a blocking of the terminal groups is not necessary. The thermostability can be further improved by decomposing the terminal formaldehyde units by an alkaline treatment until the comonomer units next to the chain end are reached. The polymers which have been decomposed in this manner have a considerably better thermostability than acetylated homopolymers of trioxane.

In the copolymerization the ratio of the monomers can be varied within wide limits. Especially favorable copolymers are obtained, however, when the monomer mixture subjected to copolymerization contains 1 to 40% by weight of cyclic ethers, calculated on the total mixture. Copolymers into which as little as one weight percent of cyclic ethers has been incorporated already have an improved thermostability. Increasing amounts of ether provoke an increasing improvement of the thermostability.

As cationically active catalysts there can be used those compounds which can take up one or more electron pairs in an incomplete valence shell of one of their atoms. Suitable catalysts are thus compounds which can be considered as electron acceptors or Lewis acids (cf. Kortüm, Lehrbuch der Elektrochemie, Wiesbaden, 1948, pages 300 and 301). From among the great number of inorganic compounds known as Lewis acids and active as polymerization catalysts there are mentioned by way of example $BCl_3$, $AlCl_3$, $FeCl_3$, $SbCl_3$, $SbCl_5$, $ZnCl_2$, $SnCl_4$, $TiCl_4$ and preferably $BF_3$.

For initiating the poylmerization there may likewise be used complex compounds of Lewis acids, for example the etherates or amino complex compounds or the complex compounds of acrylonitrile and Lewis acids.

It has surprisingly been found that also a mixture of acrylonitrile and fluoboric acid starts the polymerization after a short while.

Catalysts which are likewise very active in the process of the invention and the use of which is preferred on account of their easy handling and dosability are salts of Lewis acids, for example the oxonium salts such as
trimethyl-,
triethyl-,
tri-n-propyl-oxonium-fluoroborate,
methyltetramethylene-oxonium-fluoroborate,
ethyltetramethylene-oxonium-fluoroborate,
methyl- or
ethyl-pentamethylene-oxonium-fluoroborate the oxonium salts of dimethylpyrone, cumarine and camphor, furthermore the oxonium salts of analogous structure or inner oxonium salts of iron, antimony or tin, for example
trialkyl-oxonium-tetrachloroferriate,
trialkyl-oxonium-hexachloroantimonate or
bis-trialkyl-oxonium-hexachlorostannate.

Further suitable catalysts are the complex compounds of Lewis acids with inorganic acids.

In the process of the invention it is especially suitable to use substituted aryldiazonium-fluoroborates for initiating the polymerization. These compounds can be readily prepared in the required purity. They are solid, very stable products which permit an exact dosage and are highly soluble in the monomer melt.

The polymerization sets in after a certain time of induction. The time of induction depends on the rate of decomposition of the diazonium-fluoroborates at the polymerization temperature or on the dissociation constant of the complex compound sat said temperature.

Suitable monomer-soluble phenyldiazonium-fluorobates are those which carry in any position of the aromatic nucleus one or several substitutents for example alkyl groups such as the methyl, ethyl, propyl, butyl or hexyl group; substituted or unsubstituted cycloalkyl groups such as the cyclohexyl group; aryl groups such as the phenyl or naphthyl group; alkoxy groups with 1 to 8 carbon atoms, the phenoxy group, halogen atoms, preferably chlorine atoms, ester groups, the nitrile group, alkylsulfonyl groups, sulfonamide groups, or arylazo groups.

Further suitable diazonium fluoroborates can be derived from aromatic substances such as fluorene, carbazole and anthraquinone.

The following aryldiazonium-fluoroborates are given by way of example:

(a) Light-active diazonium salts

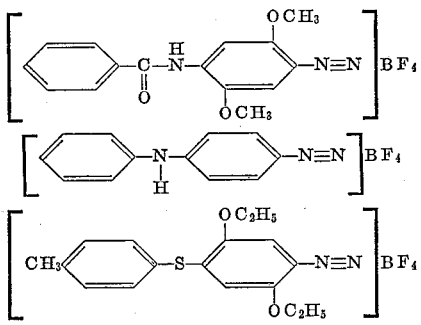

(b) Thermo-active diazonium salts which can simultaneously be activated by light

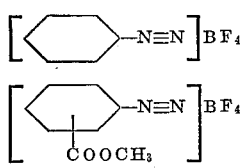

the radical —COOCH₃ standing in ortho, meta or para-position.

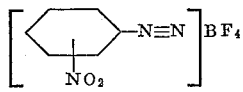

the —NO₂ group standing in ortho, meta or para-position.

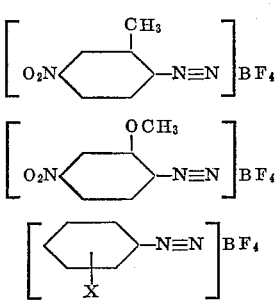

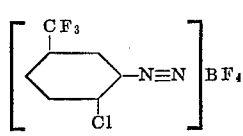

X representing halogen, preferably F or Cl in ortho, meta or para-position.

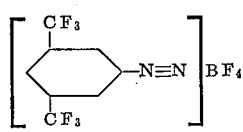
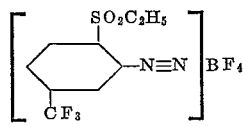
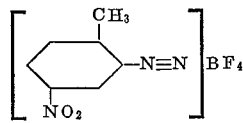
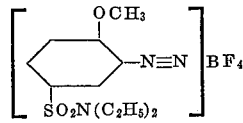
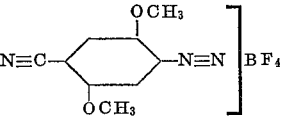
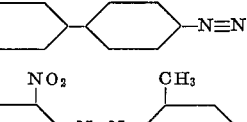
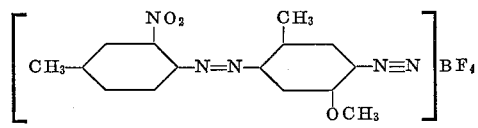
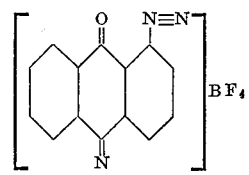
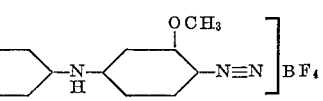
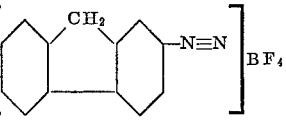
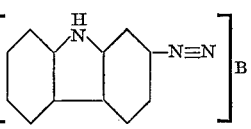
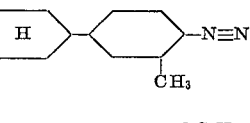
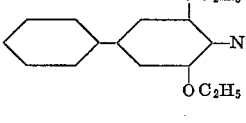
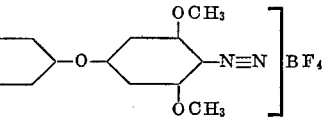

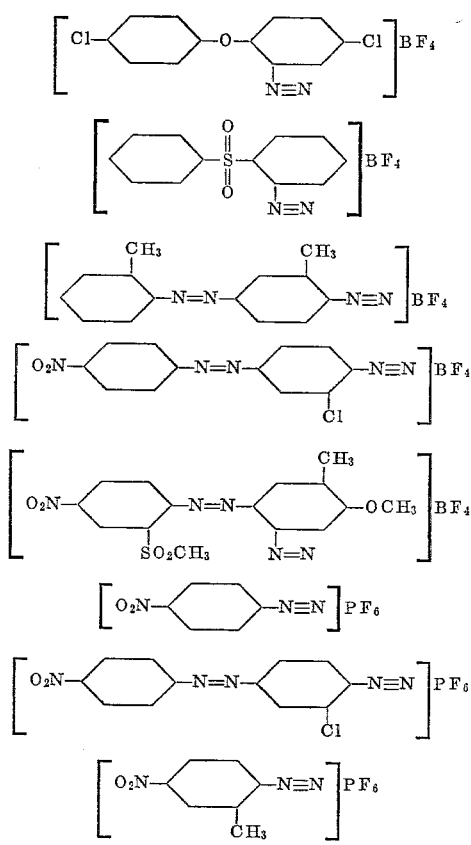

The catalyst is used in an amount of 0.0001 to 4.0 weight percent, preferably 0.001 to 1.0 weight percent, calculated on the weight of the monomer mixture.

The amount of catalyst used depends on its activity, the purity of the monomers and the chosen reaction conditions. Since the rate of polymerization increases as the amount of catalyst increases, the catalyst must be used in such an amount that the evolved polymerization heat can be well eliminated. A strong heating of the polymerization bath would lead to the formation of low molecular weight polymers.

The copolymerization of cyclic acetals, preferably of trioxane, with oxacylopropane or oxacyclobutane or the derivatives thereof is carried out at a temperature in the range of —20° C. to +120° C. and preferably 30° C. to 100° C. During polymerization atmospheric humidity must be excluded. Moreover, it is suitable to operate with exclusion of atmospheric oxygen, for example by blanketing with nitrogen.

After the addition of the catalyst the polymerization sets in a few minutes and in most cases it is complete after one hour. The hard polymer block obtained is comminuted, finely ground and for eliminating the catalyst and non reacted monomer the polymer powder is boiled in a lower molecular weight alcohol, for example methanol or ethanol, which contains 1 to 3 percent (calculated on the weight of the alcohol) of ethanol amine for neutralizing the catalyst.

After the processing white copolymers are obtained the terminal groups of which can be stabilized by alkaline degradation of the unstable terminal groups and which can be further stabilized against heat, oxidation and light by the addition of known stabilizers.

By the known methods of thermoplastic processing the polymers obtained can be worked up into very tough and elastic films and foils and various injection molded articles.

The following examples serve to illustrate the invention, but they are not intended to limit it thereto, the parts being by weight unless otherwise stated.

Example 1

0.008 part of the complex compound of boron trifluoride and tetrahydrofurane was added, while stirring and with exclusion of atmospheric humidity, to a mixture of 100 parts of molten trioxane and 2 parts of epichlorhydrin which was maintained at 70° C. The polymerization set in at once and yielded after a short while a solid white block of polymer.

The block was comminuted and finely ground. The polymer powder was boiled under reflux for one hour with 250 parts of methanol containing 3 parts of ethanolamine. The polymer was filtered off with suction, repeatedly washed with methanol and dried at 70° C.

When heated under nitrogen for 30 minutes at 202° C. the crude polymer lost 4.0% of its weight. The product had a reduced viscosity of 0.76, determined at 140° C. with a 0.5% solution of the polymer in butyrolactone containing 2 weight percent of diphenylamine as stabilizer.

The polymer was reprecipitated three times from butyrolactone. After the first precipitation the chlorine content remained constant at 0.6% by weight, corresponding to 1.6% of epichlorhydrin in the polymer.

Example 2

0.012 part of p-nitrophenyl-diazoniumfluoborate was dissolved, while stirring for a short while, in a mixture of 100 parts of molten trioxane and 5 parts of epichlorhydrin maintained at 62° C. The polymerization set in after 4 minutes and yielded in a short time a solid polymer block. The block was comminuted and processed as described in Example 1. After the processing the crude polymer lost 2.9% of its weight when heated for 30 minutes at 202° C. The product had a reduced viscosity of 0.85, determined as specified in Example 1.

After having been reprecipitated twice from butyrolactone the chlorine content remained constant at 1.6% by weight, corresponding to a content of 4.2% by weight of epichlorhydrin in the polymer.

Example 3

0.015 part of p-cyclohexyl-o-methylphenyl-diazoniumfluoborate was dissolved, while stirring for a short while, in a mixture of 100 parts of molten trioxane and 10 parts of epichlorhydrin maintained at 62° C. The polymerization set in after 7 minutes and yielded in a short period of time a solid polymer block. The block was comminuted and processed as described in Example 1.

After the processing the crude polymer lost 2.0% of its weight when heated for 30 minutes at 202° C. The product had a reduced viscosity of 0.98, determined as specified in Example 1.

After having been reprecipitated three times from butyrolactone the product contained 3.3% by weight of chlorine, corresponding to a content of 8.7% by weight of epichlorhydrin in the polymer.

Example 4

0.017 part of the complex compound of boron trifluoride and tetrahydrofurane was added, with the exclusion of humidity and while stirring, to a mixture of 90 parts of molten trioxane and 10 parts of 3-methyl-3-chloromethyl-oxacyclobutane maintained at a temperature of 75° C. The polymerization which set in at once, yielded after a short time a solid polymer block. The block was comminuted and processed as described in Example 1.

After processing the crude polymer lost 3.1% of its weight when heated for 30 minutes at 202° C. under nitrogen. The product had a reduced viscosity of 0.95 determined as specified in Example 1.

The polymer was reprecipitated three times from cyclohexanone. After the second reprecipitation the chlorine content remained constant at 1.7% by weight, corresponding to a content of 5.9% by weight of 3-methyl-3-chloromethyl-oxacyclobutane in the polymer.

Example 5

0.01 part of the complex compound of boron trifluoride with diethyl ether was added, while vigorously stirring and with exclusion of humidity, to a mixture of 100 parts of molten trioxane and 2 parts of 3,3-bis-chloromethyl-oxacyclobutane maintained at 65° C. The polymerization set in at once and yielded in a short time a solid polymer block. The block was comminuted and processed as described in Example 1.

After processing, the crude polymer lost 3.2% of its weight when heated for 30 minutes at 202° C. under nitrogen. The product had a reduced viscosity of 0.82, determined as specified in Example 1.

After having been reprecipitated twice from cyclohexanone, the product contained 0.4% by weight of chlorine, corresponding to 0.9% by weight of 3,3-bis-chloromethyl-oxacyclobutane in the polymer.

Example 6

0.005 part of gaseous boron trifluoride was introduced, with exclusion of humidity and while vigorously stirring, into a mixture of 95 parts of molten trioxane and 5 parts of 3,3-bis-chloromethyl-oxacyclobutane maintained at a temperature of 62° C. The polymerization which set in at once yielded quickly a solid polymer block. The block was comminuted and processed as described in Example 1.

After processing, the crude polymer lost 2.4% of its weight when being heated for 30 minutes at 202° C. under nitrogen. The product had a reduced viscosity of 0.98, determined as specified in Example 1.

After having been reprecipitated twice from cyclohexanone the polymer contained 1.4% by weight of chlorine, corresponding to 3.1% by weight of 3,3-bis-chloromethyl-oxacyclobutane in the polymer.

Example 7

0.02 part of p-nitrophenyl-diazoniumfluoborate was dissolved in a mixture of 90 parts of molten trioxane and 10 parts of 3,3-bis-chloromethyl-oxacyclobutane maintained at a temperature of 60° C. The polymerization which set in after 10 minutes yielded after a short time a solid polymer block. The block was comminuted and processed as described in Example 1.

After processing, the crude polymer lost 1.9% of its weight when heated for 30 minutes at 202° C. The product had a reduced viscosity of 1.26 determined as described in Example 1.

Reprecipitated twice from cyclohexanone the polymer contained 3.0% by weight of chlorine, corresponding to 6.5% by weight of 3,3-bis-chloromethyl-oxacyclobutane in the polymer.

Example 8

0.031 part of p-phenyl-phenyldiazoniumfluoborate was dissolved at 55° C. in a mixture of 80 parts of molten trioxane and 20 parts of 3,3-bis-chloromethyl-oxacyclobutane. The polymerization set in after 15 minutes and yielded in the course of 30 minutes a solid polymer block. The block was comminuted and processed as described in Example 1.

After processing, the crude polymer lost 1.1% of its weight when heated for 30 minutes at 202° C. The product had a reduced viscosity of 1.53, determined as specified in Example 1.

Reprecipitated three times from cyclohexanone the polymer had a chlorine content of 5.4% by weight, corresponding to 11.8% by weight of 3,3-bis-chloromethyl-oxacyclobutane in the polymer.

Example 9

4 parts of liquid ethylene oxide were dissolved in 100 parts of molten trioxane maintained at 70° C. and, while stirring for a short while, 0.012 part of p-nitrophenyl-diazoniumfluoborate was added. Polymerization set in after 4 minutes and yielded a solid polymer block after a short time. The block was comminuted and processed as described in Example 1.

After processing, the polymer lost 1.8% of its weight when heated for 30 minutes at 202° C. The product had a reduced viscosity of 0.92, determined as specified in Example 1.

We claim:

1. A process for the manufacture of high molecular weight copolymers which comprises copolymerizing trioxane with at least one cyclic ether selected from the group consisting of compounds of the formulas

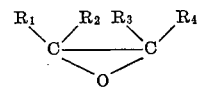

and

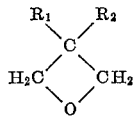

wherein each of $R_1$, $R_2$, $R_3$, and $R_4$ in said formulas is a member selected from the group consisting of hydrogen, alkyl groups having 1 to 8 carbon atoms, cycloalkyl groups, cycloalkyl groups substituted by alkyl groups having 1 to 4 carbon atoms, halogen-substituted cycloalkyl groups, aralkyl groups, and halogen-substituted alkyl groups having 1 to 8 carbon atoms, at a temperature of from —20° C. to 120° C., and in admixture with from 0.0001 to 4 percent, by weight of trioxane, of an aryl diazonium fluoborate catalyst.

2. A process as in claim 1 wherein said catalyst is used in an amount of from 0.001 to 1.0 percent, by weight of trioxane.

3. A process as in claim 1 wherein said cyclic ether is epichlorohydrin.

4. A process as in claim 1 wherein said cyclic ether is 3-methyl-3-chloromethyl-oxacyclobutane.

5. A process as in claim 1 wherein said cyclic ether is 3,3-bis-chloromethyl-oxacyclobutane.

6. A process as in claim 1 wherein said cyclic ether is ethylene oxide.

7. A process as in claim 1 wherein said aryl diazonium fluoborate is light-active.

8. A process as in claim 1 wherein said aryl diazonium fluoborate is thermo-active.

References Cited by the Examiner

UNITED STATES PATENTS

| | | | |
|---|---|---|---|
| 3,027,352 | 3/1962 | Walling et al. | 260—67 |
| 3,112,280 | 11/1963 | Farthing | 260—67 |

FOREIGN PATENTS

| | | |
|---|---|---|
| 1,243,668 | 9/1960 | France. |
| 878,163 | 9/1961 | Great Britain. |

OTHER REFERENCES

Latremouille et al.: Journ. Amer. Chem. Soc., vol. 82, 120–124 (Jan. 5, 1960).

Worsfold et al.: Journ. Amer. Chem. Soc., vol. 79, 897–902 (Feb. 20, 1957).

WILLIAM H. SHORT, *Primary Examiner.*

LOUISE P. QUAST, *Examiner.*